(12) United States Patent
Schmitz

(10) Patent No.: US 12,447,837 B2
(45) Date of Patent: Oct. 21, 2025

(54) APPARATUS FOR DETECTING AN ELECTRICAL CONNECTION

(71) Applicant: Dr. Ing. h.c. F. Porsche Aktiengesellschaft, Stuttgart (DE)

(72) Inventor: Stefan Schmitz, Vaihingen / Enz (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 557 days.

(21) Appl. No.: 17/982,569

(22) Filed: Nov. 8, 2022

(65) Prior Publication Data

US 2023/0182591 A1 Jun. 15, 2023

(30) Foreign Application Priority Data

Dec. 10, 2021 (DE) .................. 10 2021 132 661.3

(51) Int. Cl.
*B60L 53/16* (2019.01)
*B60L 53/18* (2019.01)
*B60R 16/02* (2006.01)
*H02J 7/02* (2016.01)

(52) U.S. Cl.
CPC ............... *B60L 53/16* (2019.02); *B60L 53/18* (2019.02); *B60R 16/02* (2013.01); *H02J 7/02* (2013.01)

(58) Field of Classification Search
CPC .................................. B60L 53/16; B60L 53/18
USPC ........................................................ 320/109
See application file for complete search history.

(56) References Cited

U.S. PATENT DOCUMENTS 10,259,331 B2 * 4/2019 Sauer .................. B60L 53/16
2022/0360026 A1 * 11/2022 Lin ........................ H01R 24/68

FOREIGN PATENT DOCUMENTS

| CN | 202221911 | 5/2012 |
|---|---|---|
| DE | 102010053072 | 8/2011 |
| DE | 102012005681 | 10/2012 |
| DE | 102011106335 | 1/2013 |
| EP | 2581257 | 4/2013 |
| WO | 2012139778 | 10/2012 |

* cited by examiner

*Primary Examiner* — Nathaniel R Pelton
(74) *Attorney, Agent, or Firm* — Gerald E. Hespos; Michael J. Porco

(57) ABSTRACT

An apparatus for detecting a plug-in connection has first, second and third electrical conductors, a first measuring arrangement, and a charging connection. The charging connection enables connection to a single-phase power grid to connect the first active conductor to the first electrical conductor, the second active conductor to the second electrical conductor, and the third electrical conductor to the protective conductor. The first measuring arrangement has an AC voltage source, a first measuring apparatus, and an evaluating apparatus. The AC voltage source applies a first AC voltage having at least a first frequency between the first and third conductors to generate a first AC current. The first measuring apparatus generates a first signal characterizing the first AC current caused by the first AC voltage. The evaluating apparatus evaluates the first signal to decide which plug-in connection the charging connection is connected to for charging.

8 Claims, 2 Drawing Sheets

APPARATUS FOR DETECTING AN ELECTRICAL CONNECTION

CROSS-REFERENCE TO RELATED APPLICATION

This application claims priority on German Patent Application No 10 2021 132 661.3 filed Dec. 10, 2021, the entire disclosure of which is incorporated herein by reference.

BACKGROUND

Field of the Invention. The invention relates to an apparatus for detecting an electrical connection, an in-cable box, and a charging device.

Related Art. U.S. Pat. No. 10,259,331 B2 and WO 2012/139778 A2 disclose a charging apparatus with temperature monitoring on the mains plug.

EP 2 581 257 A2 discloses a battery charging device for an electric vehicle. The device detects a location, and based on that detection, determines whether charging is performed at a charging station or at an electrical outlet. The charging power is adjusted according to that determination.

CN 202 221 911 U discloses a charging cable with a temperature sensor arranged in a plug.

It is an object of the invention to provide an apparatus for detecting an electrical connection, to provide a new in-cable box, and to provide a charging device.

SUMMARY

An apparatus for detecting a connected plug-in connection comprises a first electrical conductor, a second electrical conductor, a third electrical conductor, a first measuring arrangement, and a charging connection. The charging connection is configured to enable a connection of the first electrical conductor, the second electrical conductor, and the third electrical conductor to a single-phase power grid with a first active conductor, a second active conductor, and a protective conductor in such a way that the first active conductor is connected to the first electrical conductor, the second active conductor to the second electrical conductor, and the third electrical conductor to the protective conductor. The first measuring arrangement comprises an AC voltage source, a first measuring apparatus, and an evaluating apparatus. The AC voltage source is configured to apply a first AC voltage having at least a first frequency between the first electrical conductor and the third electrical conductor to generate a first AC current. The first measuring apparatus is configured to generate a first signal characterizing the first AC current caused by the first AC voltage. The evaluating apparatus is configured to evaluate the first signal and decide, as a function of the first signal, whether the charging connection is connected for a charging operation via a plug-in connection from a first plug-in connection group. The first plug-in connection group comprises at least: a first plug-in connection that can be loaded with a predetermined first maximum power indefinitely as intended; and a second plug-in connection that can be loaded with a predetermined second maximum power as intended, and that can be loaded with a predetermined third maximum power after the expiry of the predetermined first period of time. The third maximum power is less than the second maximum power.

The apparatus thereby allows a detection of at least two different plug-in connections and can react accordingly and increase security directly or indirectly by passing on the information.

The charging connection of some embodiments is configured to allow a connection of the electrical conductors to a three-phase power grid. The apparatus can thus be used in a wide variety of ways.

The first plug-in connection of some embodiments is designed according to the standard IEC 60309, and the second plug-in connection of some embodiments is designed according to the standard DIN VDE 0620-1. These are preferred standards for multiple European countries.

The apparatus may be configured to generate a second signal upon detection of a connection of the charging connection for a charging operation via a plug-in connection from the first plug-in connection group. The second signal carries a first piece of information regarding which of the plug-in connections from the first plug-in connection group has been detected, and control apparatuses can react with the aid of this signal.

The apparatus of some embodiments is configured to generate a third signal upon detection of a connection of the charging connection for a charging operation via a second plug-in connection. The third signal may carry a second piece of information during a predetermined second period of time. The second piece of information may indicate that a fourth maximum power is possible. The third signal also may carry a third piece of information after the expiry of the second period of time. The third piece of information may indicate that a fifth maximum power is possible. The fifth maximum power may be lower than the fourth maximum power. The second period of time in some embodiments is less than or equal to the intended first period of time. For this purpose, for example, a corresponding value for the maximum power can be output, or, according to an agreed-upon protocol, the value HIGH can be output on a digital line for as long as a high maximum power is possible, and the value LOW can be output when a reduction of the permissible maximum power is required.

In some embodiments, the fourth maximum power is greater than the third maximum power and less than the second maximum power, and the fifth maximum power is less than the third maximum power. As a result, during the second period of time, with a high maximum power, charging can quickly be performed and then a reduction can be made to a safe lower maximum power.

The first measuring apparatus of some embodiments comprises a band pass filter. The band pass filter may be configured to be permeated by the at least one first frequency and to attenuate frequencies below the at least one first frequency and above the at least one first frequency at least in predetermined frequency ranges. Because the AC voltage for the measurement has a much lower amplitude than the AC voltage of the power grid, the filter assists in the evaluation.

This invention also relates to an in-cable control box that has such an apparatus and can increase safety.

The invention further relates to a charging device that has such an apparatus, and thus also can increase safety.

Further details and advantageous further developments of the invention will emerge from the exemplary embodiments, which are described below and illustrated in the drawings and are not to be construed as limiting the invention in any way. It goes without saying that the features mentioned above and those yet to be discussed below can be used not only in the respectively specified combination, but also in other combinations or on their own, without leaving the scope of the present invention.

DETAILED DESCRIPTION

Figure 1:
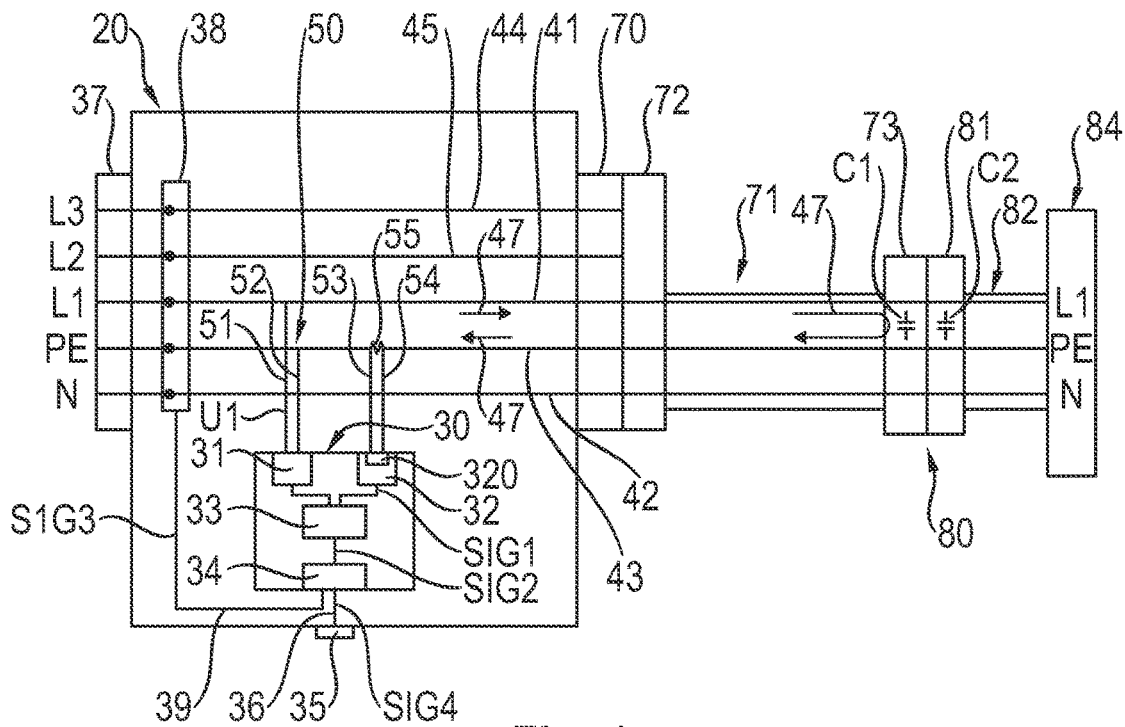
FIG. 1 is a schematic view of an apparatus for detecting a plug-in connection.

Parts that are the same or have the same effect are provided with the same reference numerals in the following, and are usually described only once. The descriptions of all of the figures build on one another to avoid unnecessary repetitions.

Figure 2:
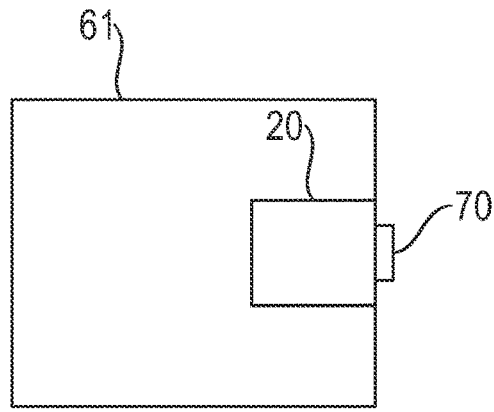
FIG. 2 is a schematic view of a charging device with the apparatus of FIG. 1.
Figure 3:
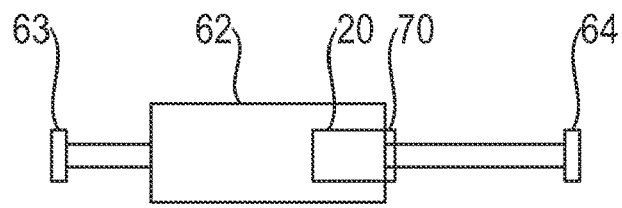
FIG. 3 is a schematic view of an in-cable control box having the apparatus of FIG. 1.

At the outset, it should be understood that should be understood that the elements and functions described herein and shown in FIGS. 1-3 may be implemented in various forms of hardware, software or combinations thereof. These elements may be implemented in a combination of hardware and software on one or more appropriately programmed general-purpose devices, which may include a processor, memory and input/output interfaces. The term "connected" as used or implied herein mean directly connected to or indirectly connected with through one or more intermediate components. Such intermediate components may include both hardware and software-based components. FIG. 1 shows an apparatus 20 for detecting a connected plug-in connection 80.

Those skilled in the art will appreciate that the Figures represent conceptual views of illustrative circuitry embodying the principles of the disclosure and/or also represent various processes that may be represented substantially in computer readable media and so executed by a computer or processor, whether or not such computer or processor is explicitly shown.

The functions described herein may be carried out with a control unit that may be provided through the use of dedicated hardware as well as hardware capable of executing software in association with appropriate software. In one embodiment, some or all of the functions may be performed by at least one processor, such as a computer or an electronic data processor, digital signal processor or embedded microcontroller, in accordance with code, such as computer program code, software, and/or integrated circuits that are coded to perform such functions, unless indicated otherwise. When provided by a processor, the functions may be provided by a single dedicated processor, by a single shared processor, or by a plurality of individual processors, some of which may be shared. Moreover, the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included in the control unit, such as a memory, input/output interfaces, a wireless transceiver, analog-to-digital converters, etc.

The apparatus 20 has a first electrical conductor 41, a second electrical conductor 42, a third electrical conductor 43, a fourth electrical conductor 44, and a fifth electrical conductor 45, a first measuring arrangement 30, a separating apparatus 38, an interface 35, a charging connection 70, and a connection 37.

The electrical conductors 41, 42, 44, and 45 are active conductors and can, for example, serve as live conductors for a single-phase power grid having an outer conductor L1 and a neutral conductor N or for a three-phase power grid with the outer conductors L1, L2, L3 and the neutral conductor N.

The electrical conductor 43 is used as a protective conductor PE.

By way of example, a charging cable 71 is connected to the charging connection 70 via a charging cable connection 72, and the charging cable 71 has a mains-side connection 73 that is connected via the plug-in connection 80 to a connection 81 of a power grid or supply system 84 connected via lines 82. For example, the connection 81 is a domestic power outlet.

The separating apparatus 38 enables a disconnection of the charging connection 70 from the connection 37. This disconnection is controlled via a signal SIG3. For this purpose, the separating apparatus 38 comprises, for example, protection switches or other switches.

The measuring arrangement 30 comprises an AC voltage source 31, a measuring apparatus 32, an evaluating apparatus 33, and a control apparatus 34.

By way of example, the AC voltage source 31 is connected to the electrical conductor 41 via a first line 51 and to the electrical conductor 43 via a line 52 in order to imprint an AC voltage U1 at an imprinting site 50. Alternatively, the imprinting at the imprinting site 50 can occur capacitively or inductively or otherwise. The AC voltage source 31 is configured to apply the first AC voltage U1 with at least a first frequency f1 between the first electrical conductor 41 and the third electrical conductor 43 in order to generate an AC current 47. By way of example, the first frequency f1 is 1 kHz or 10 kHz. The AC voltage U1 also can be generated with plural first frequencies f1 or with a frequency band, for example 5 kHz, 20 kHz and/or 10.000 kHz to 10.001 kHz.

The measuring apparatus 32 is configured to generate a first signal SIG1 characterizing the first AC current 47 caused by the first AC voltage U1. In some embodiments, the first measuring apparatus 32 comprises a band pass filter 320 that is configured to be permeated by the at least one first frequency f1 and to attenuate frequencies below the at least one first frequency f1 and above the at least one first frequency f1 at least in predetermined frequency ranges.

The measuring apparatus 32 is connected to a coil 55 via two lines 53, 54, and the AC current 47 can be measured inductively via the coil 55. Alternatively, a measurement can be performed capacitively or via a shunt. As a further alternate, the measurement of the current 47 can be performed on the electrical conductor 41. In some embodiments, the measurement is done on the electrical conductor 41 or 42, on the side of the charging connection 70 when viewed from the imprinting site 50. This allows the AC current 47 to be measured directly.

The evaluating apparatus 33 is configured to evaluate the first signal SIG1 and, as a function of the first signal SIG1, to decide the type of plug-in connection 80 via which the charging connection 70 is connected to the power grid 84. The evaluating apparatus 33 may comprise a processor or controller as described above and used with appropriate software as described above.

Operating Principle

Different types of connections exist for the power system 84, and the type of connection and the maximum power that can be derived usually are defined via the connection 81.

For three-phase connections, the associated connection 81 typically is designed for continuous maximum power. However, for single-phase connections 81, there are different connection types with different maximum powers, and some connection types provide the maximum power in a time-dependent manner.

For example, there exist so-called CEE plug-in connections according to the standard IEC 60309, which are provided for either a three-phase connection or a single-phase connection. It is also possible to use corresponding plug-in connection elements 73 and 81 for the plug-in connection 80, and these are provided for a three-phase connection in a single-phase manner. The connections 81 provided according to the stated standard are designed for continuous operation at a first maximum power and, for example, in case of a single-phase use, a current of 16 A can flow continuously. At an AC voltage of 230 V, this delivers a maximum power output of 3.68 kW. The three-phase CEE plug-in connections are typically red in color and are referred to as CEE three-phase plug-in connections or industrial multi-phase plugs, and the single-phase CEE plug-in connections are blue in color and are also referred to as CEE plug-in connections. In other countries, such as in the USA or France, there are other plug-in connections that are designed for continuous operation at the maximum power as intended.

Other connections 81 are standardized in DIN VDE 0620-1, and such a plug-in connection 80 is also referred to as a Schuko plug-in connection, or alternatively, Schuko/CEE. They include plugs and outlets. These connections 81 are common in Germany, for example, for domestic use and similar applications. Schuko outlets have two connections for active conductors (outer conductor L1 and neutral conductor N) and a lateral connection for the protective conductor PE. Connections 81 according to this standard are intended to allow a higher second maximum power for a predetermined first period of time and then allow a lower third maximum power after the expiry of this predetermined first period of time. This operation protocol is used because the connection 81 in Schuko outlets typically is not designed for a continuously high maximum power, and heat damage can occur over the long term. For example, a maximum current of 16 A can flow for one hour as intended, and, at the end of that hour, the maximum allowable current is 10 A. The protective conductor PE is made smaller for these plug-in connections 80 than for the CEE plug-in connections 80. In France, for example, there are Schuko/CEE plug-in connections of the CEE 7/5 type and CEE 7/6 type.

The charging connection 70 allows the connection of various charging cables 71, and thus various maximum powers are also possible. It would be possible to always limit the maximum derivable power to the lowest value that one of the possible plug-in connections 80 allows. However, in cases where a higher maximum power would be possible, the charging duration of a vehicle or other unit to be charged via the connection 37 is longer than necessary, because a higher charging power could actually be used for charging.

Trials have shown that the plug-in connections 80 are of a different construction according to the different standards, in particular in the field of the PE protective conductor, and this results in different capacities C1, C2 between the individual conductors in the field of the plug-in connection 80. By applying the AC voltage U1, an AC current can flow through the capacities C1, C2, and, due to the different sizes of the capacities C1, C2 at different plug-in connections 80, the apparatus 20 can draw a conclusion as to which type of plug-in connection 80 is used.

The total capacity is proportional to the quotient from the measured AC current 47 and the time derivation of the AC voltage U1. For example, the AC current 47 can also flow to and from the next transformer station of the power grid 84, and an attenuation of this influence occurs due to the longer paths. Theoretically, it is also possible to measure on the side of the plug 37, when viewed from the imprinting site 50, but this requires further circuitry on this side enabling an indirect measurement of the effect of the capacities C1, C2.

The measurement of the AC current can be carried out, for example, as an amplitude measurement, as an amplitude average, as an amount average, or as a square average.

Thus, by evaluating the signal SIG1, the evaluating apparatus 33 (e.g. processor and/or controller used with appropriate software) can detect the plug-in connection 80 electrically connected to the charging connection 70 and can generate a signal SIG2 that carries a piece of information regarding which of the plug-in connections has been detected from the first plug-in connection group containing the different plug-in connections 80.

For example, the measuring arrangement can output the signal SIG2 directly via the interface 35, which can also be integrated in the connection 37.

The control apparatus 34 can perform further steps as a function of the signal SIG2 and can output a signal SIG 3 to the separating apparatus 38 or a signal SIG4 via the interface 35.

For example, when detecting connection of the charging connection 70 for a charging operation via a second plug-in connection, the control apparatus 34 can generate the signal SIG4 so that, during a predetermined second period of time, the control apparatus 34 carries a second piece of information regarding the fact that a fourth maximum power is possible, and, after the end of the second period of time, the control apparatus 34 carries a third piece of information regarding the fact that a fifth maximum power is possible. The fifth maximum power is lower than the fourth maximum power. In some embodiments, the second period of time is less than or equal to the intended first period of time. In some embodiments, the fourth maximum power is greater than the third maximum power and less than the second maximum power, and the fifth maximum power is less than the third maximum power. This allows for higher-power charging during the second period of time and safe charging after the second period of time has expired.

For example, when the second plug-in connection belongs to a connection that is intended to allow for a maximum power of 3.6 kW for one hour, and subsequently allows a maximum power of 2.5 kW, the fourth maximum power can be set to 3.2 kW or 3.4 kW, and the fifth maximum power can be set to 2.4 kW or 2.2 kW. The second duration can be set to 50 minutes or 55 minutes.

For example, the blocking apparatus 38 can be non-conductively switched during the determination of the plug type to prevent interference through an apparatus connected to connection 37. In addition, if the permissible maximum power is exceeded, the blocking apparatus 38 can also be switched non-conductively. For this purpose, the apparatus 20 can have a power measuring apparatus—not shown—or can receive and evaluate a value sent from the arrangement connected to connection 37.

FIG. 2 shows a charging device 61 comprising the apparatus 20 with the charging connection 70. The charging device 61 may be part of an electric vehicle and/or may comprise a traction battery, and thus can limit the maximum power to a permissible value as a function of the signal SIG2 or SIG4.

FIG. 3 shows an in-cable control box 62 having the apparatus 20, a mains-side connection 64 connected via the charging connection 70, and a consumer-side connection 63 for a connected consumer, such as a battery or an electric motor.

Figure 4:
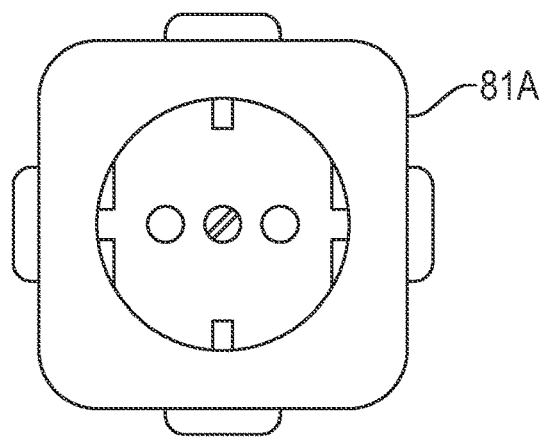
FIG. 4 is a top plan view of a plug-in connection for a house connection.

FIG. 4 shows a Schuko socket 81A, as used for example in Germany, and is not designed for continuous operation at a maximum power level. This Schuko outlet also is referred to as CEE 7/3 or Type F. The associated Schuko plug is standardized under the designation CEE 7/4. Another plug-in connection that is not designed for continuous operation at a maximum power rating is the French outlet, also referred to as outlet type E or CEE 7/5. The associated French plug is referred to as plug type E or CEE 7/6.

Figure 5:
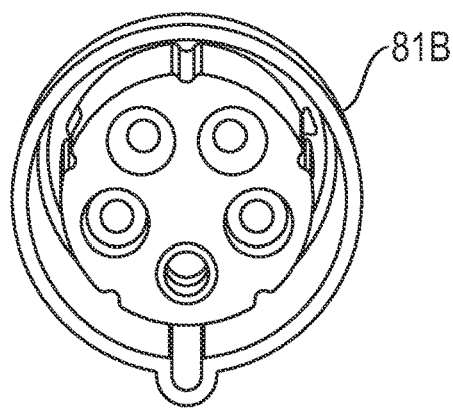
FIG. 5 is a top plan view of a three-phase plug-in connection.

FIG. 5 shows a three-phase 400-V socket 81B, referred to as a CEE three-phase plug-in connection, standardized according to the standard IEC 60309, and having a red color according to the standard.

Figure 6:
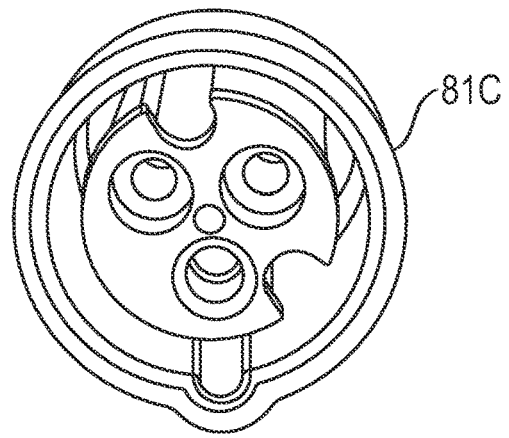
FIG. 6 is a top plan view of a single-phase plug-in connection.

FIG. 6 shows a 230-V three-phase socket 81C, referred to as a CEE plug-in apparatus, standardized according to the standard IEC 60309 and having a blue color according to the standard.

The apparatus 20 can be adapted to different plug-in connection types 80, so it is not limited to detecting said plug-in connections 80.

Many variants and modifications are of course possible within the scope of the present invention.

The plug-in connections can comprise plugs, sockets, couplings, outlets, or other elements on the individual sides.

The invention claimed is:

1. An apparatus (20) for detecting a connected plug-in connection (80), the apparatus (20) comprising: a first electrical conductor (41), a second electrical conductor (42), a third electrical conductor (43), a first measuring arrangement (30), and a charging connection (70), the charging connection (70) being configured to enable a connection of the first electrical conductor (41), the second electrical conductor (42), and the third electrical conductor (43) to a single-phase power grid (84) having a first active conductor (L1; N), a second active conductor (N; L1), and a protective conductor (PE) so that the first active conductor (L1; N) is connected to the first electrical conductor (41), the second active conductor (N; L1) to the second electrical conductor (42), and the third electrical conductor (43) to the protective conductor (PE), the first measuring arrangement (30) comprises an AC voltage source (31), a first measuring apparatus (32), and an evaluating apparatus (33), the AC voltage source (31) is configured to apply a first AC voltage (U1) having at least a first frequency between the first electrical conductor (41) and the third electrical conductor (43) to generate a first AC current (47), the first measuring apparatus (32) is configured to generate a first signal (SIG1) characterizing the first AC current (47) caused by the first AC voltage (U1), the evaluating apparatus (33) is configured to evaluate the first signal (SIG1) and decide as a function of the first signal (SIG1) whether the charging connection (70) is connected for a charging operation via a plug-in connection (80) from a first plug-in connection group, the first plug-in connection group comprises at least the following plug-in connections:
a first plug-in connection that can be loaded with a predetermined first maximum power indefinitely, and
a second plug-in connection that can be loaded with a predetermined second maximum power, and that can be loaded with a predetermined third maximum power after expiration of the predetermined first period of time, the third maximum power being less than the second maximum power.

2. The apparatus of claim 1, wherein the first plug-in connection is designed according to the standard IEC 60309 and wherein the second plug-in connection is designed according to the standard DIN VDE 0620-1.

3. The apparatus of claim 1, that is configured to generate a second signal (SIG2) upon detection of a connection of the charging connection (70) for a charging operation via a plug-in connection (80) from the first plug-in connection group, the second signal (SIG2) carries a first piece of information regarding which of the plug-in connections (80) from the first plug-in connection group has been detected.

4. The apparatus of claim 1, that is configured to generate a third signal (SIG3) upon detection of a connection of the charging connection (70) for a charging operation via a second plug-in connection, the third signal (SIG3) carrying a second piece of information during a predetermined second period of time regarding the fact that a fourth maximum power is possible, and the third signal (SIG3) carrying a third piece of information after expiration of the second period of time and indicating that a fifth maximum power is possible, the fifth maximum power being lower than the fourth maximum power, and the second period of time being less than or equal to the intended first period of time.

5. The apparatus of claim 4, wherein the fourth maximum power is greater than the third maximum power and less than the second maximum power, and the fifth maximum power is less than the third maximum power.

6. The apparatus of claim 1, wherein the first measuring apparatus (32) comprises a band pass filter (320) that is configured to be permeated by the at least one first frequency (f1) and to attenuate frequencies below the at least one first frequency (f1) and above the at least one first frequency (f1) at least in predetermined frequency ranges.

7. An in-cable control box comprising the apparatus of claim 1.

8. The charging device comprising the apparatus of claim 1.

* * * * *